United States Patent [19]
Flanders et al.

[11] Patent Number: 6,115,379
[45] Date of Patent: Sep. 5, 2000

[54] UNICAST, MULTICAST, AND BROADCAST METHOD AND APPARATUS

[75] Inventors: John A. Flanders, Ashland, Mass.; Ryan T. Ross, Londonderry, N.H.; William D. Townsend, Groton, Mass.; Thomas A. Lemaire, Acton, Mass.; Thomas V. Radogna, Westborough, Mass.; Robert A. Ciampa, Andover, Mass.; Brian W. Bailey, Lunenburg, Mass.

[73] Assignee: 3Com Corporation, Santa Clara, Calif.

[21] Appl. No.: 08/927,914

[22] Filed: Sep. 11, 1997

[51] Int. Cl.⁷ ........................................... H04L 12/56
[52] U.S. Cl. .................... 370/392; 370/401; 370/409
[58] Field of Search .................................. 370/389, 392, 370/401, 402, 409

[56] References Cited

U.S. PATENT DOCUMENTS 5,963,556  10/1999  Varghese et al. ................. 370/401
5,982,775  11/1999  Brunner et al. ................... 370/401
5,991,297  11/1999  Palnati et al. .................... 370/389
6,014,380   1/2000  Hendel et al. .................... 370/392

*Primary Examiner*—Huy D. Vu
*Assistant Examiner*—Dung Trinh
*Attorney, Agent, or Firm*—Weingarten, Schurgin, Gagnebin & Hayes LLP

[57] ABSTRACT

At least a portion of the data units in a bridge/router are processed by logic circuits according to cast type. The cast type, source address and destination address of an incoming data unit are determined by examining the header. For a unicast data unit, the source address and destination address are employed to obtain a transmit port indicator from memory, and the unicast data unit is directed to the port indicated by the transmit port indicator. For a non-unicast data unit, the source address and destination address are employed to obtain a first port mask that indicates valid ports for receipt of the data unit and a second port mask that indicates valid ports for transmission of the data unit from memory. The first and second port masks are combined to generate a third port mask, and the non-unicast data unit is directed to the ports indicated by the third port mask.

7 Claims, 6 Drawing Sheets

PARENT MASK:  0 0 1 1

FORWARD MASK: 1 1 1 1

BRIDGE FORWARD MASK: 0 0 1 1

RX PORT

PRUNED MASK:  0 0 1 0

PARENT MASK:  1 1 0 0

FORWARD MASK: 1 1 1 1  AND

ROUTE FORWARD MASK: 1 1 0 0

TYPE TABLE 81

| | Output | | | | Input |
|---|---|---|---|---|---|
| | MSB | | | | LSB |
| | 0      3 | 4      7 | 8      11 | 12      15 | 16      31 |
| | Res. | Proto Index | Res. | Proto VLAN | Protocol Type |
| 0 | | | | | |
| 1 | | | | | |
| 2 | | | | | |
| 3 | | | | | |
| 4 | | | | | |
| 5 | | | | | |
| 6 | | | | | |
| 7 | | | | | |
| 8 | | | | | |
| 9 | | | | | |
| 10 | | | | | |
| 11 | | | | | |
| 12 | | | | | |
| 13 | | | | | |
| 14 | | | | | |
| 15 | | | | | Default - protocol not recognized |

32 bits * 16 entries = 512 bits

LLC TABLE 91

| | Output | | | | Input |
|---|---|---|---|---|---|
| | MSB | | | | LSB |
| | 0      3 | 4      7 | 8      11 | 12      15 | 16      31 |
| | Res. | Proto Index | Res. | Proto VLAN | /LLC-DSAP:SSAP |
| 0 | | | | | |
| 1 | | | | | |
| 2 | | | | | |
| 3 | | | | | |
| 4 | | | | | |
| 5 | | | | | |
| 6 | | | | | |
| 7 | | | | | |
| 8 | | | | | |
| 9 | | | | | |
| 10 | | | | | |
| 11 | | | | | |
| 12 | | | | | |
| 13 | | | | | |
| 14 | | | | | |
| 15 | | | | | Default - protocol not recognized |

32 bits * 16 entries = 512 bits

*FIG. 5*

PARENT MASK: 0 0 1 1
FORWARD MASK: 1 1 1 1
BRIDGE FORWARD MASK: 0 0 1 1
↑
RX PORT
PRUNED MASK: 0 0 1 0

PARENT MASK: 1 1 0 0
FORWARD MASK: 1 1 1 1  AND
ROUTE FORWARD MASK: 1 1 0 0

FIG. 6

UNICAST, MULTICAST, AND BROADCAST METHOD AND APPARATUS

CROSS-REFERENCE TO RELATED APPLICATIONS

NOT APPLICABLE

STATEMENT REGARDING FEDERALLY SPONSORED RESEARCH OR DEVELOPMENT

NOT APPLICABLE

BACKGROUND OF THE INVENTION

The present invention is generally related to telecommunications switching, and more particularly to efficient unicast, multicast, and broadcast support within telecommunications switching devices.

In a telecommunications network, end-stations may be interconnected through devices such as bridges and routers. Data units originating from an end-station are received, examined and sometimes redirected and altered by such interconnecting devices to facilitate transmission of the data unit to one or more target end-stations. Data unit traffic must be handled differently depending upon whether the traffic is unicast, multicast or broadcast traffic. Unicast traffic comprises data units that are received at a single entry port of the device and transmitted from a single exit port of the device. Multicast traffic comprises data units that are received at a single input port and transmitted from a plurality of output ports. Broadcast traffic comprises data units that are received at a single input port and transmitted through all available exit ports.

Devices that support unicast, multicast, and broadcast transmission are known. Such devices typically employ a software analysis of the header portion of the data unit. However, such devices are relatively slow and may adversely affect network performance.

BRIEF SUMMARY OF THE INVENTION

Data units are processed by logic circuits in a telecommunications bridge/router at speeds approximating frame reception rates ("wire speed") according to whether the data units are unicast, multicast or broadcast data units. The cast type (i.e., designation as unicast, multicast or broadcast), source address and destination address of an incoming data unit are determined by examining the header portion of the data unit. For a unicast data unit, the network layer source address and network layer destination address are employed by the logic circuits to obtain a transmit port indicator from a cache memory and the unicast data unit is directed to the port indicated by the transmit port indicator. For a non-unicast data unit, the network layer source address and network layer destination address are employed by the logic circuits to obtain a first port mask that indicates valid ports for receipt of the data unit and a second port mask that indicates valid ports for transmission of the data unit from memory. The first and second port masks are combined to generate third and fourth port masks, and the non-unicast data unit is directed to the ports indicated by the third and fourth port masks. In particular, a third port mask for bridged data units is generated by performing a logical AND operation on the first and second port masks. A fourth port mask for routed data units is generated by performing a logical AND operation on the second port mask and the inverse of the first port mask.

The logic circuits allow faster processing than known techniques which employ software based processing. A series of operations are performed on each data unit to support unicast, multicast and broadcast operation. Logic circuits can simultaneously perform a plurality of such operations, while software based processors generally perform such operations singly. Hence, the logic circuits allow faster processing.

BRIEF DESCRIPTION OF THE DRAWING

The invention will be more fully understood in view of the following Detailed Description of the Invention, in conjunction with the Drawing, of which:

FIG. 5 illustrates Type and LLC tables; and

FIG. 6 illustrates forward mask generation.

DETAILED DESCRIPTION OF THE INVENTION

Figure 1:
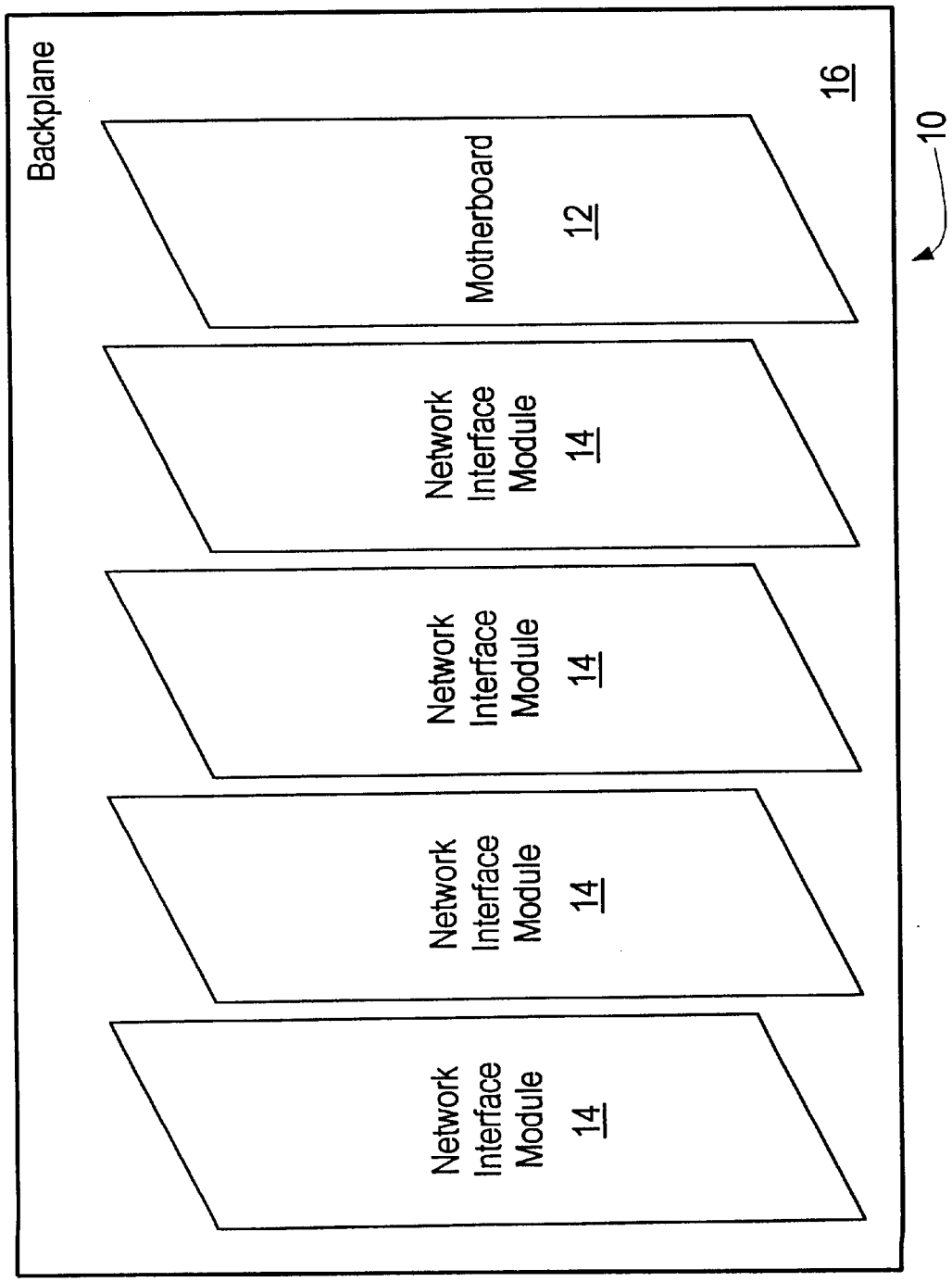
FIG. 1 is a block diagram of a device for bridging and routing.
Figure 2:
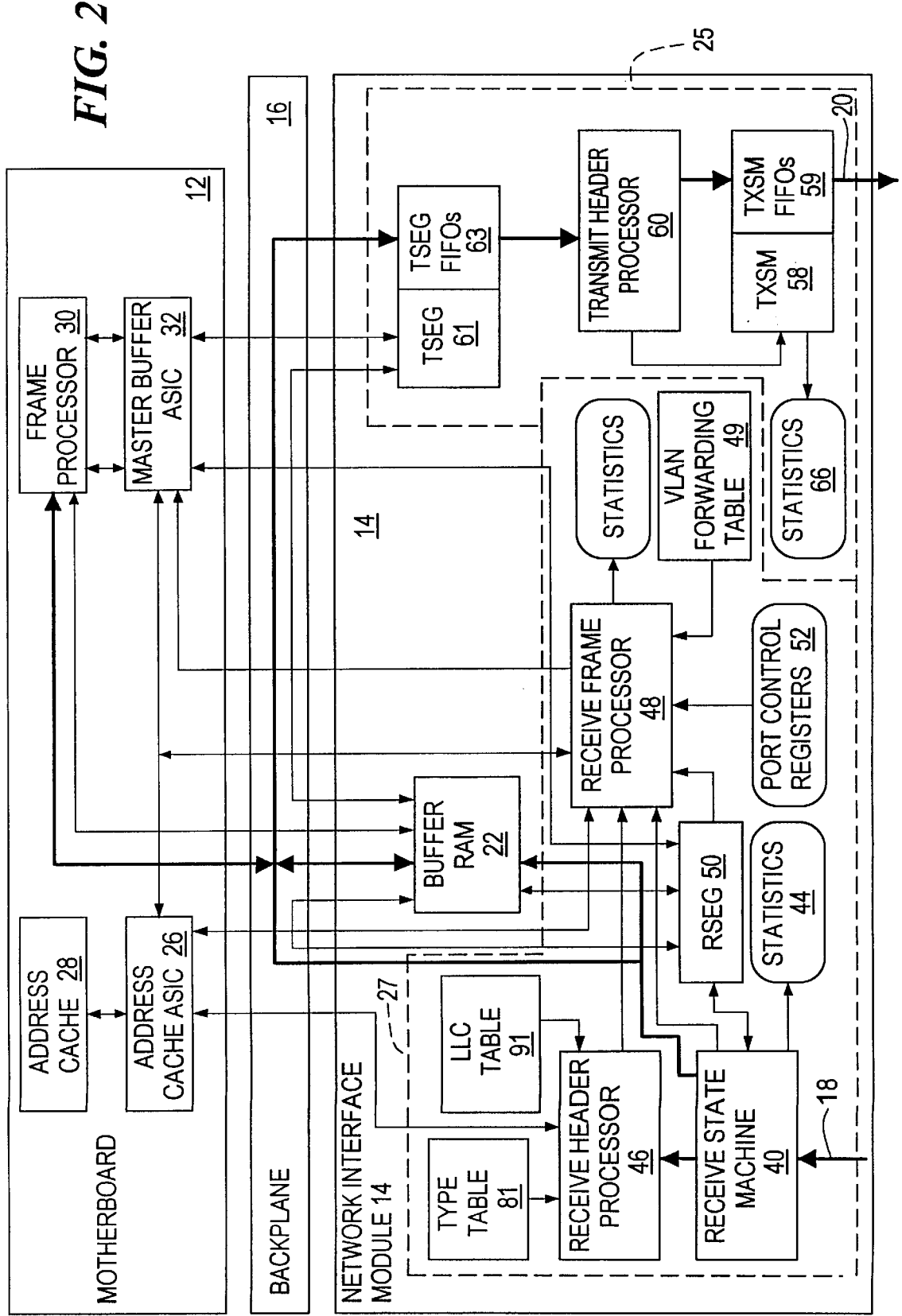
FIG. 2 is a block diagram which illustrates the interface module and motherboard of FIG. 1.

Referring to FIGS. 1 and 2, a bridge/router for use in a telecommunications network includes a motherboard 12 and at least one network interface module 14 which are interconnected through a backplane 16. Separate interface modules support Ethernet, Fiber Distributed Data Interface ("FDDI") and Asynchronous Transfer Mode ("ATM") traffic. In one embodiment each 10/100Mb Ethernet interface module has six ports, each gigabit Ethernet interface module has one port, each FDDI interface module has six ports and each ATM interface module has two OC3 ports or one OC12 port. The ports provide connections to other devices in the network, through which data units can be received and transmitted. Incoming data units may be bridged, routed, translationally bridged and filtered by the bridge/router. Logic circuits in the motherboard and interface modules are responsible for data unit reception and transmission, parsing Data Link and Network Layer headers, looking up source and destination Media Access Control ("MAC") and Network Layer addresses and making forwarding decisions.

The motherboard 12 includes an Address Cache ASIC ("ACA") 26 with associated address cache memory 28, a Frame Processor ("FP") 30 and a Master Buffer ASIC ("MBA") 32. The Address Cache ASIC 26 is responsible for performing cache 28 lookups on Destination Addresses ("DAs") and Source Addresses ("SAs"). The Address Cache ASIC is employed to obtain MAC addresses for bridging support and Network Layer addresses for routing support. The Master Buffer ASIC 32 is responsible for data buffer management in buffer RAM 22.

Each network interface module includes buffer RAM 22, a Transmit ASIC ("TA") 25 and a Receive ASIC ("RA") 27. The Transmit ASIC and Receive ASIC are specific to the type of data traffic which the network interface device is designed to support (such as Ethernet, ATM and FDDI). The Receive ASIC 27 functions to perform a preliminary analysis on incoming data units. The Transmit ASIC 25 functions to transmit data units.

The Receive ASIC 27 includes a Receive State Machine ("RXSM") 40, a Receive Header Processor ("RHP") 46 and a Receive Frame Processor ("RFP") 48. The Receive State Machine is responsible for receiving data units through one or more ports from an associated communications link. After receiving a data unit, the Receive State Machine 40 generates data unit status information. The status information, which contains error information and byte and frame count data on a per port basis, is stored in registers 44. The Receive Header Processor 46 is responsible for identifying data units to be bridged or routed, determining inbound data unit encapsulation type, and performing protocol specific processing for routed data units. The Receive Header Processor also determines which VLAN, if any, each incoming frames is received on. There are different versions of Receive Header Processors 46 for different network interface types, e.g., Ethernet, FDDI and ATM. The Receive Header Processor 46 is primarily implemented in microcode. A Receive Segmentation DMA controller ("RSEG") 50 controls storage of received data units within appropriate buffer RAM 22 locations and forwards status information to the Receive Frame Processor 48. Information in a VLAN forwarding table 49 is employed by the Receive Frame Processor 48 to verify if the data unit is allowed to be forwarded through the outbound interface. In particular, the Receive Frame Processor 48 is responsible for making forwarding decisions based on information supplied by the Receive Header Processor 46, Address Cache ASIC 26, Receive State Machine 40, the RSEG 50, the RSEG 50, the per Port Control Registers 52, and VLAN configuration information contained in configuration tables associated with the Receive Frame Processor 48. The Receive Frame Processor 48 also generates Transmit Vectors for data units being processed in hardware over a fast processing path and Receive Vectors for data units being passed to the Frame Processor 30 software for further processing over a slower path. The Receive Frame Processor 48 is implemented partially in microcode.

The Transmit ASIC 25 includes a Transmit State Machine ("TXSM") 58, a plurality of Transmit State Machine FIFOs 59, and a Transmit Header Processor ("THP") 60. A Transmit Segmentation Controller ("TSEG") 61 serves to move data unit segments from locations within the Buffer RAM 22 into an input FIFO designated as the TSEG FIFO 63, which comprises an input FIFO to the Transmit Header Processor 60. The Transmit Header Processor 60 performs any necessary header translations and, upon completion of such translations, moves the translated header to the Transmit State Machine FIFO 59. The Transmit Header Processor 60 also inserts VLAN tags into frames as necessary. Data units are forwarded from the Transmit State Machine FIFO 59 over the respective output port 20 of the network interface module 14. The Transmit State Machine 58 is responsible for controlling transmission of data units from the respective output port 20. Following transmission, the Transmit State Machine 58 generates data unit transmit status information which is stored in registers 66. The status information includes error information and transmit byte and frame count information on a per port basis. Different versions of the Transmit State Machine 58 are provided for different network interface module types, e.g., Ethernet, FDDI and ATM.

Figure 3:
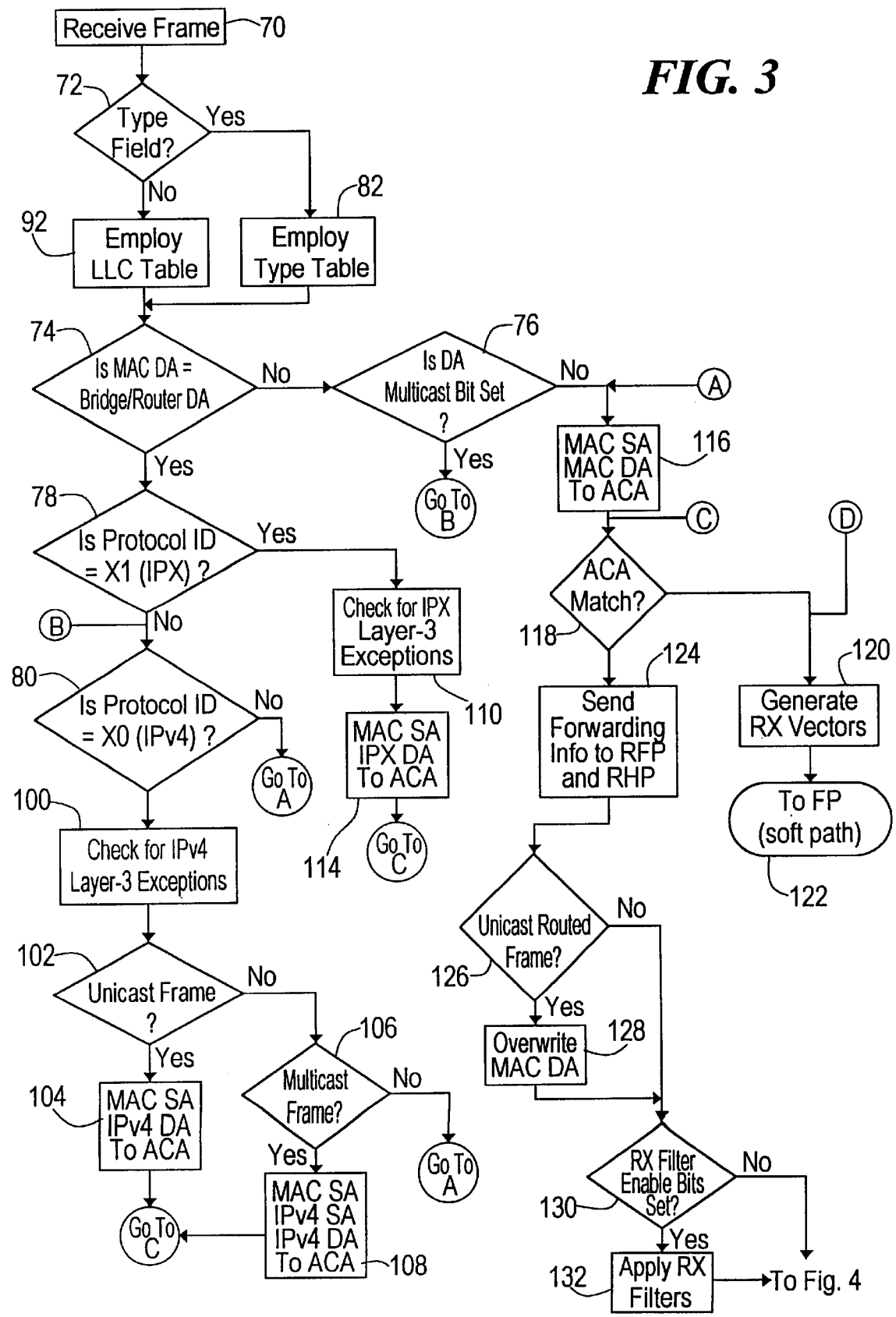
FIGS. 3–4 are flow diagrams which illustrates processing of data units.
Figure 4:
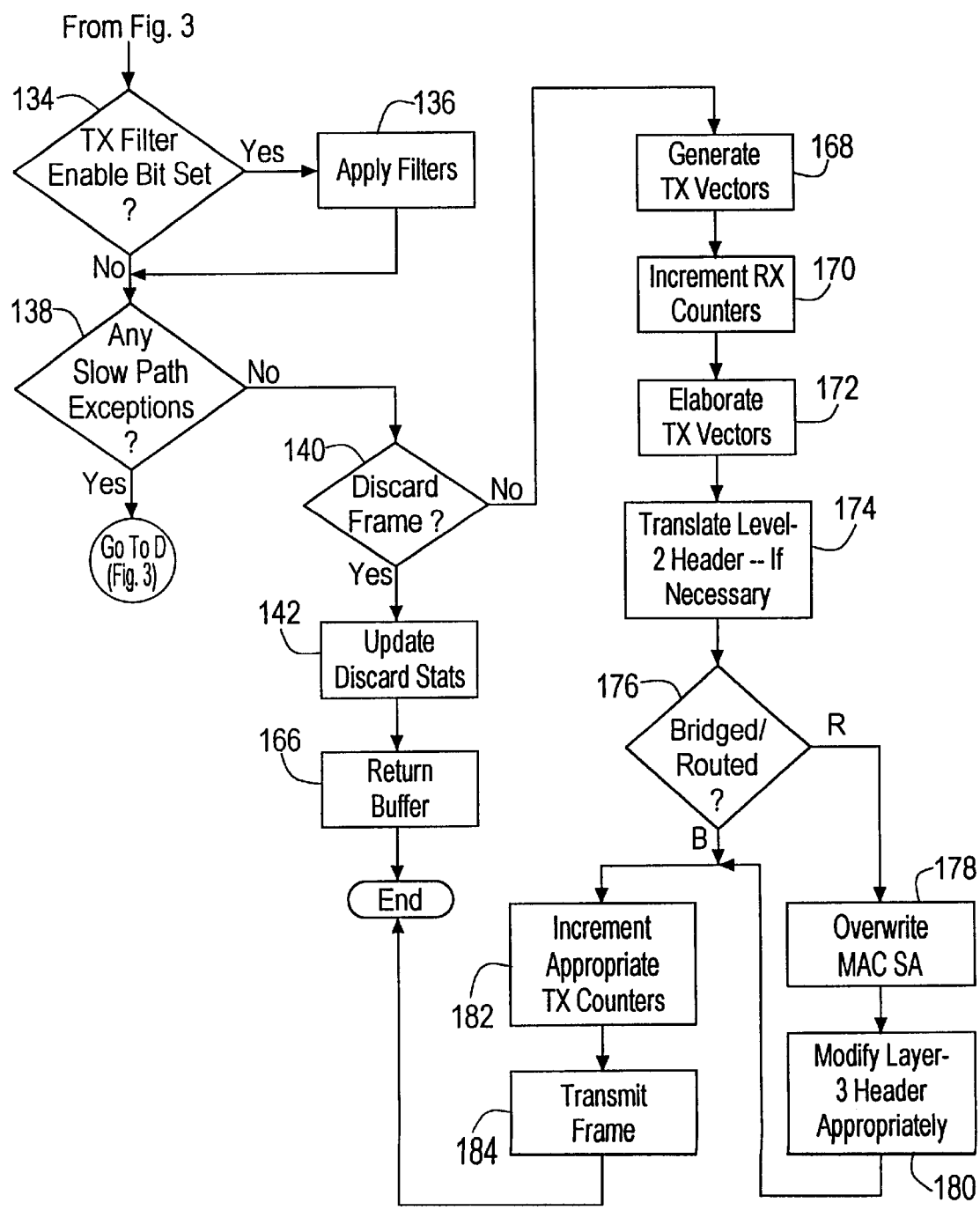

FIGS. 3 and 4 illustrate hardware based processing in logic circuits in a network interface module 14 configured for Ethernet traffic. When an Ethernet frame header is received in the bridge/router at the Receive Header Processor 46 as shown in step 70, the layer 2 header of the frame is examined as shown in steps 72, 74, 76, 78 and 80. Given a header with the format: Destination Address ("DA")/ Source Address ("SA")/Type (e.g., IPv4, Appletalk etc.)/ Layer 3 header, the Receive header Processor will first examine the location of the Type/Length field as shown is step 72. In particular, the value of the field following the SA field is compared with the predetermined value (1500) above which the field is determined to be a Type field. If the field is determined to be a Type field, then the Type Table 82 is employed to determine if the Type is one of fifteen predefined values which correspond to a specific Type such as IPV4.

Referring to FIGS. 3–5, if the 16 bit Type field received in the frame matches one of the 16 bit Type values 84 programmed into the first fifteen entries of the Type Table 81 then a Protocol ID 86 and a Protocol VLAN index 89 is obtained from the first row in which there is a match. If such a match is not obtained then a default Protocol ID 86 and VLAN index 88 is retrieved from the sixteenth row 90 of the Type Table 81.

If the field was determined not to be a Type field in step 72, but rather a Length field such as in the format: DA/SA/ Length/Logical Link Control ("LLC"), an LLC table 91 is employed by the Receive Header Processor 86 to perform a lookup operation as shown in step 92 to obtain a Protocol ID 86 and a Protocol VLAN index 88. More specifically, each row in the LLC table includes a Protocol ID field 86, a Protocol VLAN index field 88, a Destination Service Access Point ("DSAP") 94 field and a Source Service Access Point ("SSAP") 96 field. If the 16 bit DSAP/SSAP field received in the frame matches one of the 16 bit DSAP/SSAP values, 94 and 96, programmed into the first fifteen entries of the LLC Table 91 then a Protocol ID 86 and a Protocol VLAN index 88 is obtained from the first row in which there is a match. If such a match is not obtained then a default Protocol ID 86 and VLAN index 88 is retrieved from the sixteenth row 96 of the LLC Table 91.

In step 74 the Receive Header Processor 46 will determine if the Received DA is equal to one of a plurality of MAC address which have been assigned to the Bridge/ Router. More specifically, if the upper three bytes of the received MAC DA, the Organization Unique Identifier ("OUI"), matches the programmed OUI of the Bridge/ Router, then the lower three bytes of the received MAC DA are examined to determine whether the value indicated by the lower three bytes of the received MAC DA falls within a predefined range. The upper and lower bounds of the predefined range are maintained in first and second respective registers. If the lower three bytes of the MAC DA do not fall within the range, the RHP will then determine if the MAC DA multicast bit is set as shown in step 76. If the received MAC DA multicast bit is not set the frame will be processed as a bridge only frame and the RHP 46 will send the MAC SA and MAC DA obtained from the received frame to the Address Cache ASIC 26 as shown in step 116.

If, in step 74, the received OUI is equal to the predefined OUI and the lower three bytes of the received MAC DA fall within the predefined range, the RHP will then determine if the received frame is one of two types of datagrams, IPv4 or IPX, which can be routed in its entirety by the hardware as shown in steps 78 and E80. An Ipv4 or IPX datagram is identified by use of either the Type Table 81 or LLC Table 91,. If the received frame is neither an Ipv4 or IPX datagram the frame will be processed as a bridge only frame and the RHP 46 will send the MAC SA and MAC DA obtained from the received frame to the Address Cache ASIC 26 as shown in step 116.

If, in step 79, the Protocol ID obtained from the Type Table 81 or LLC Table 91 indicates that the received frame is an IPX datagram then the Layer 3 IPX header portion of the frame is examined as shown in step 110. In particular, the IPX header is examined through a series of checks to determine whether the header contains an invalid length value, a packet type value indicating a NETBIOS packet type, a destination socket value of all ones, a transport control value which is greater than fifteen, a source network number of zero, a source node number of all ones and that the IPX routing enable bit is not set in the receive Port Control Register ("PCR") for the respective port. If any one of the checks is found to be true an exception bit is set, a receive vector will get generated, shown is step 120, by the receive Frame Processor 48 and the frame is forwarded to the Frame Processor 30 which is shown is step 122, for the IPX Unicast Routed frame case the RHP 46 will send the MAC SA, and the IPX destination network and host number to the ACA 26 as shown in step 114.

If, in step 80, the Protocol ID obtained from the Type Table 81 or LLC Table 91 indicates that the received frame is an IP datagram then the Layer 3 IP header portion of the frame is examined as shown in step 100. In particular the IP header is examined through a series of checks to determine whether the header contains a proper version number, has the proper header length, passes a check sum verification, indicates a Time To Live ("TTL") hop count greater than one, and that the IP routing enable bit is set in the receive Port Control Register ("PCR") for the respective port. The processing logic is specifically configured for frames of a particular version and length range. When the exception bit is set for frames which do not have the specified attributes the RFP will generated a receive vector and forwarded the frame to the Frame Processor 30 as shown is steps 139, 120 and 122. A checksum discrepancy indicates possible data corruption. The TTL hop count is employed to limit traffic caused by misdirected frames by limiting the number of devices through which the frame can be routed. Hence, if any of the checks results in a failure, an exception bit is set and the frame is forwarded to the Frame Processor.

If none of the checks performed in step 100 results in a failure, then the frame header is examined to determine whether the frame is a unicast frame as shown in step 102. In particular, a predefined multicast bit in the frame header is examined. If the multicast bit is not set then the frame is unicast frame. If the frame is a unicast frame the RHP 46 will send the MAC SA and the IPv4 Destination Address to the ACA 26 as shown is step 104. the MAC SA and the Ipv4 DA are forwarded to the ACA which will compare both the MAC SA and Ipv4 DA against stored addresses in the cache. If a match with both addresses are made the ACA will return a new MAC DA and a transmit port number to both the RHP 46 and the RFP 48. The Receive header Processor 46 then overwrites the MAC DA field in the header portion of the frame with the MAC DA retrieved from the ACA 26 as shown in step 128. The original MAC DA may be saved prior to such overwriting operation so that the original frame can be reconstructed to Support remote monitoring ("RMON") probing, including external RMON probing. If a match is not made on both addresses an exception case will be detected by the RFP 48 and the RFP will generate a receive vector and forwarded the frame to the Frame Processor 30 and shown is steps 138, 120 and 122.

If the multicast bit is set as determined in step 106 then the MAC DA is examined to determine whether the frame is designated for Ipv4 Multicast routing or as an Ipv4 broadcast bridged frame for transmission. In the case of an Ipv4 Multicast routed frame the RHP 46 sends the MAC SA and the concatenated Ipv4 Source and Ipv4 Destination Addresses to the ACA 26 as shown in step 108. The addresses transmitted from the RHP 46 to the ACA 26 are then employed by the ACA 26 to perform two lookups in the Address Cache 28. If a match is made on both addresses the ACA will transmit a 24 bit Parent Port Mask and a 24 bit Forward Mask to the Receive Frame Processor. The multicast frame may be bridged through a first set of ports and routed through a second set of ports. Both port sets are mutually exclusive. The Parent Port Mask indicates valid ports for receiving the frame and also indicates which ports are used to employ bridging.

Referring to FIGS. 3, 4, 5 and 6, a Bridge Forward Mask for a bridged version of the frame is generated by performing a logical AND operation on the Parent Mask and the Forward Mask. As further shown in FIG. 6, a Route Forward Mask for the routed version of the frame is generated by performing a logical AND operation on the (inverse of the Parent Mask) and the Forward Mask. Further, for each port in the Route Forward Mask, if the TTL of the received frame is less than the multicast TTL threshold register for that port, then that port is removed from the Route Forward Mask. The receive port is removed from the bridge mask since there is no reason to bridge the frame out of the receive port. Further, the frame is discarded if the frame is found to have entered the device through a port other than a Parent Port.

Referring again to FIGS. 3 and 4, if in step 106 the received MAC DA is the MAC broadcast address the frame will be processed as a bridge only frame and the RHP 46 will send the MAC SA and MAC DA obtained from the received frame to the Address Cache ASIC 26 as shown in step 116.

In step 130 the receive filter enable bits associated with the receive port are examined. The receive filter enable bits are maintained in the Port Control Register associated with the receive port. If the receive filter enable bits are set for the receive port then the appropriate filters are applied on the receive side as shown in step 132. The transmit port filter enable bits are then examined as shown in step 134. The transmit filter enable bits are maintained in the Port Control Register associated with the transmit port. If the transmit port filter enable bits are set for the respective indicated transmit port then the appropriate filter or filters are applied for that respective transmit port as shown in step 136, Hence, filtering can be selectively applied at the receive port and/or any combination of transmit ports.

In step 138, if the Receive Frame Processor determines that there is some exception case which needs to be handled by the software, the RFP will generate a receive vector and send the frame to the Frame Processor. If the RFP determines that there is no exception case it will then determine if the frame is to be discarded as shown in step 140. If the frame is to be discarded by the RFP the RFP will update the appropriate discard statistic counters and return the buffer as shown in steps 142 and 166.

If in step 140 the RFP determines that the frame is not going to be discarded then at least one transmit vector is generated as shown in step 168. In particular, in the case of a unicast frame the Receive Frame Processor 48 generates a transmit vector and sends such vector to the Master Buffer ASIC 32. The transmit vector includes a route flag, a frame protocol ID, a physical port forward mask and a transmit queue indicator. In the case of a multicast frame the RFP 48 transmits two transmit vectors to the Master Buffer ASIC 32. One transmit vector indicates the ports through which the frame is to be routed and the other transmit vector indicates the ports through which the frame is to be bridged. A transmit vector route bit within the vector is employed to differentiate the two transmit vectors. Receive counters associated with the RFP 48 are then incremented as shown in step 170. In particular, for the unicast Ipv4 route case the RFP 48 increments an Ipv4 Receive Unicast Frame Counter.

The Master Buffer ASIC 32 then operates on the transmit vector or vectors to specify transmit queues as shown in step 174. In particular, if the frame is to be translated then the Layer-2 header is translated to accommodate the new Layer-2 protocol.

If the frame is designated to be bridged as determined in step 176, the appropriate set of bridge transmit counters 66 will be incremented by the Transmit State Machine 58 as shown in step 182 prior to transmitting the frame as shown in step 184. If the frame is designated to be routed as determined in step 176 then the Transmit Header Processor 60 overwrites the MAC SA with the new MAC SA of the Transmit Port as shown in step 178. The THP 60 will also perform the necessary layer-3 modifications. In the IPK route case the THP will increment the Transport Control field. In the Ipv4 route case the THP will decrement the TTL field and update the checksum field. Once the necessary layer-3 modifications have been made as shown in step 180, the appropriate set of route transmit counters 66 will be incremented by the Transmit State Machine 58 as shown in step 182 prior to transmitting the frame as shown in step 184.

Having described the preferred embodiments of the invention, other embodiments which incorporate concepts of the invention will now become apparent to one skilled in the art. Therefore, the invention should not be viewed as limited to the disclosed embodiments but rather should be viewed as limited only by the spirit and scope of the appended claims.

What is claimed is:

1. A method of processing data units according to cast type in a telecommunications bridge/router, such data units including a header portion with a source address and a destination address, comprising the steps of:

determining in a first logic circuit, whether the cast type of the data unit is unicast, determining, in a second logic circuit, the source address of the data unit;

in a third logic circuit, for a unicast data unit, employing the source address and destination address to obtain a transmit port indicator from memory, and directing the unicast data unit to the port indicated by the transmit port indicator;

employing, for a non-unicast data unit, the source address and destination address to obtain a first port mask indicating valid ports for receipt of the data unit and a second port mask indicating valid ports for transmission of the data unit from memory, combining the first and second port masks to generate a third port mask and a fourth port mask, and directing the non-unicast data unit to the ports indicated by the third and fourth port masks, wherein said first and second port masks are combined in a logical AND operation to generate the third port mask for bridging.

2. The method of claim 1 including the further step of, for a non-unicast data unit, combining the inverse of the first port mask with the second port mask in a logical AND operation to generate the fourth port mask for routing.

3. The method of claim 2 wherein said step of determining whether the cast type of the data unit includes the further step of examining a predefined multicast bit in the frame header.

4. The method of claim 3 including the further step of, in the case of a unicast data unit, obtaining a new source address, destination address and transmit port number.

5. The method of claim 4 including the further step of, in the case of a non-unicast data unit, obtaining a new source address and destination address.

6. The method of claim 5 including the further step of, in the case of a non-unicast data unit, bridging the data unit through a first set of ports and routing the data unit through a second set of ports.

7. The method of claim 2 including the further step of, for a non-unicast data unit, employing a comparison of receive frame with a per transmit port threshold and removing ports not within that threshold from the fourth port mask for routing.

* * * * *